July 23, 1940.  W. S. GOUINLOCK ET AL  2,209,268
STONE PICKER FOR SELF-FEEDERS OF THRESHING MACHINES
Filed May 23, 1938  2 Sheets-Sheet 1

Inventor
Harry Truax.
W. S. Gouinlock.
By
Attorney

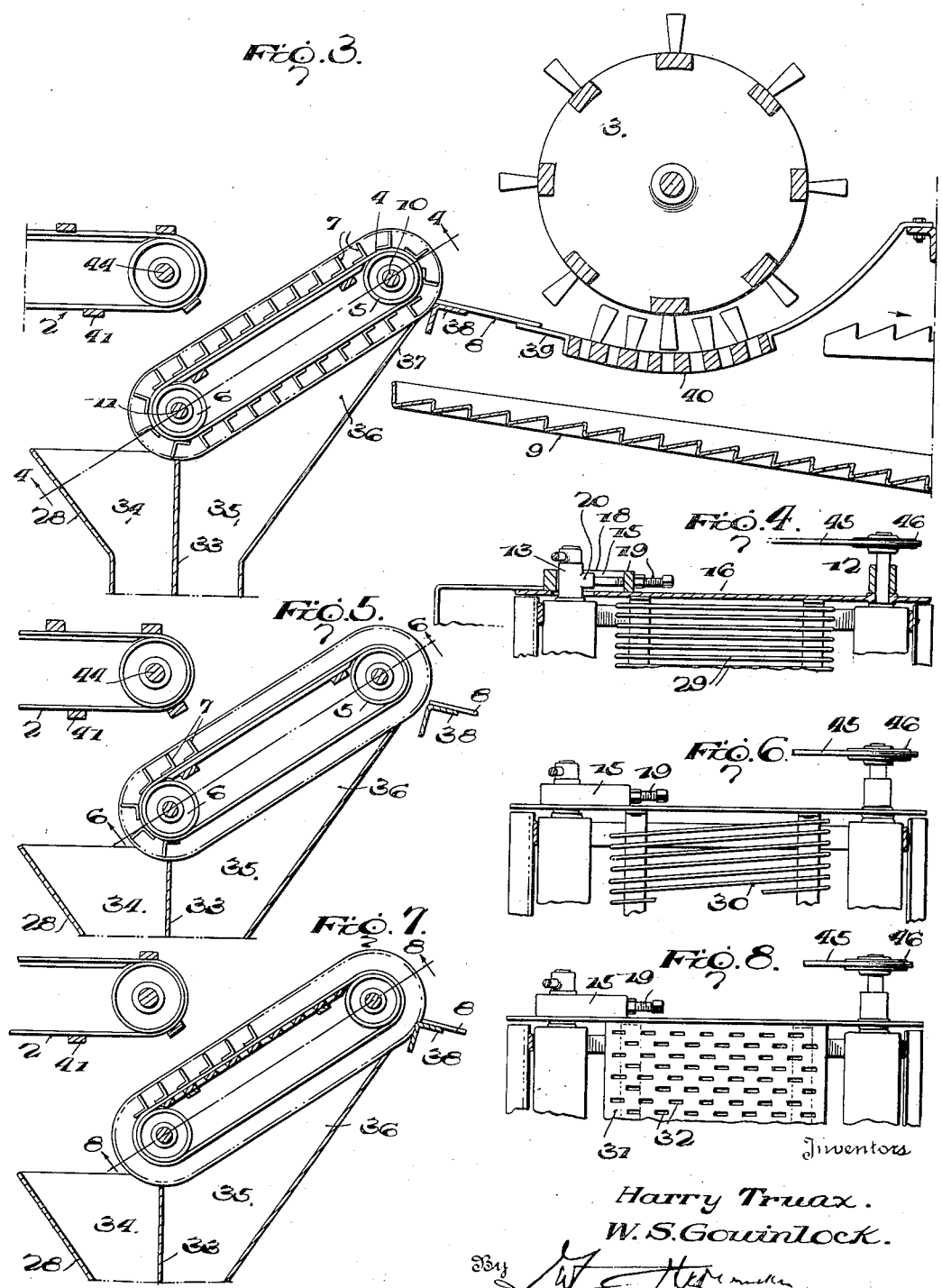

Patented July 23, 1940

2,209,268

UNITED STATES PATENT OFFICE 2,209,268

STONE PICKER FOR SELF-FEEDERS OF THRESHING MACHINES

William S. Gouinlock and Harry Truax, Batavia, N. Y., assignors to Climax Corporation, Batavia, N. Y., a corporation of New York Application May 23, 1938, Serial No. 209,578

4 Claims. (Cl. 130—1)

The invention relates to a stone picker for self-feeders of threshing machines, more particularly bean threshers.

In bringing the bean vines up to the threshing machine there are very frequently stones included which are naturally more or less damaging to the mechanism of the threshing machine. The material to be threshed is carried to the threshing cylinder of the machine by a raddle belt or conveyor, and it is an object of the present invention to interpose between the feeding conveyor and the threshing cylinder a simple, practical and efficient stone picking device of strong, sturdy and comparatively inexpensive construction comprising an inclined endless conveyor adapted to permit large stones to roll downwardly into a receptacle at the lower end of the conveyor and capable of carrying small stones and loose beans to the grain pan of the threshing machine and of permitting fine dirt to sift through it into a dirt receptacle.

A further object of the invention is to provide means consisting of a series of tines and located between the inclined endless conveyor of the stone picker and the threshing cylinder for permitting the small stones and loose beans carried up by the stone picking conveyor to drop into the grain pan below the tines while the vines and unthreshed pods are carried to the threshing cylinder.

Another object of the invention is to provide a stone picker which will divide the material thrown upon the feeding conveyor into four classes, viz., the large stones which will come out at the lower end of the stone picker, the fine dirt which will pass through the stone picker and fall into a dirt receptacle, the loose beans and medium sized stones which will drop into the grain pan and the vines and pods which will be delivered to the threshing cylinder.

Another object of the invention is to provide means for adjusting the stone picking conveyor and for holding the same at the proper inclination to suit conditions.

Another object of the invention is to equip the stone picker with a casing divided into two compartments one forming a dirt receptacle and extending substantially the entire length of the inclined endless conveyor to receive all of the dirt passing through the same and the other compartment extending outwardly beyond the lower end of the inclined conveyor and forming a receptacle or chute for large stones.

With these and other objects in view, the invention consists in the construction and novel combination and arrangement of parts hereinafter fully described, illustrated in the accompanying drawings and pointed out in the claims hereto appended, it being understood that various changes in the form, proportion and details of construction, within the scope of the claims, may be resorted to without departing from the spirit or sacrificing any of the advantages of the invention.

In the drawings:

Fig. 3 is an enlarged central longitudinal sectional view of the stone picker and the adjacent portions of feeding conveyor and the threshing machine.

Fig. 4 is a detail sectional view taken on the line 4—4 of Fig. 3.

Fig. 5 is a vertical longitudinal sectional view of a stone picker having another form of apertured platform.

Fig. 6 is a sectional view of the same taken on the line 6—6 of Fig. 5.

Fig. 7 is a central vertical longitudinal sectional view of a stone picker having a perforated platform.

Fig. 8 is a sectional view of the same taken on the line 8—8 of Fig. 7.

Figure 1:
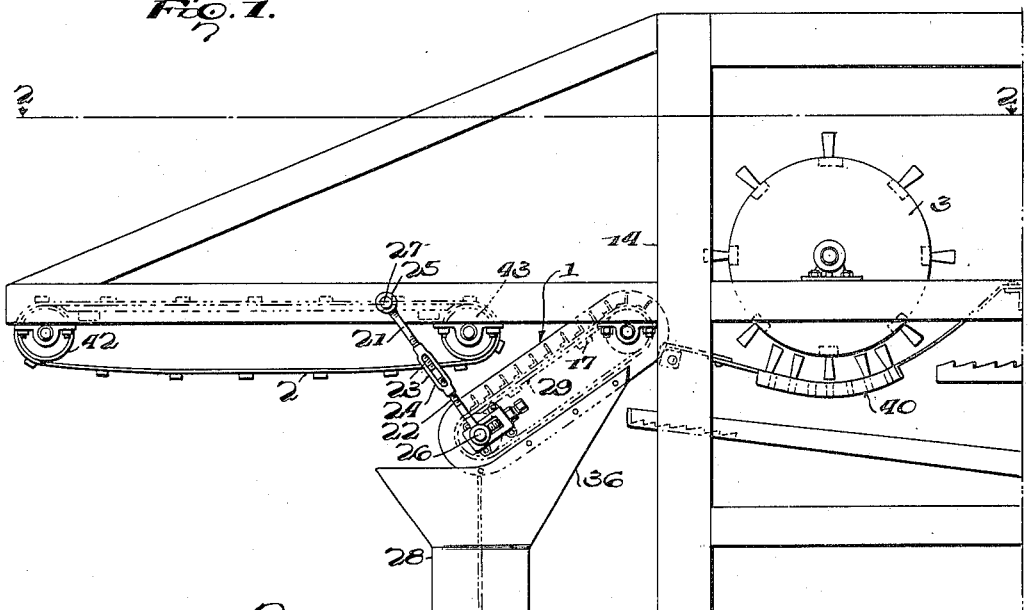
Fig. 1 is a side elevation of a portion of a self-feeding bean threshing machine provided with a stone picker constructed in accordance with this invention.
Figure 2:
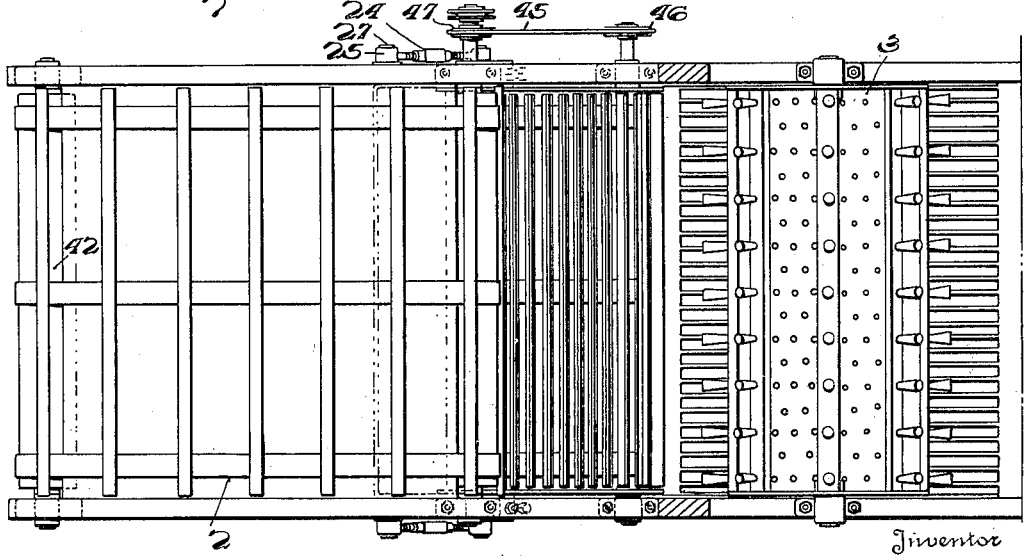
Fig. 2 is a horizontal sectional view taken substantially on the line 2—2 of Fig. 1.

Referring particularly to Figs. 1 to 4, inclusive, of the accompanying drawings the stone picker comprises in its construction an inclined endless conveyor 1 located between the feeding conveyor 2 and the threshing cylinder 3 of a bean threshing machine although the stone picker is applicable to various threshing machines for removing from the material fed to the machine dirt and stones to prevent such objects from coming in contact with the threshing mechanism and injuring the same. The inclined stone picker conveyor may consist of a plurality of endless belts 4 arranged on upper and lower transverse rollers or pulleys 5 and 6 and carrying transversely disposed pocket forming blades 7 which may conveniently consist of angle bars of steel or other suitable material secured to the endless belts 4. The endless belts 4 which are arranged in spaced relation are arranged at the center and end portions of the rollers but any desired number of belts may be employed or the endless conveyor may be formed by an endless flexible apron of any suitable material, which may either be smooth or provided with pockets of any suitable construction. The pocket forming blades are arranged to form spaces or pockets of a size to receive and carry upwardly small stones and loose grain and at the same time permit large stones to roll down the inclined conveyor to the lower end thereof. The small stones and loose grain are carried upwardly by the inclined conveyor and are discharged over the top of the same and pass through spaced tines 8 and fall upon the grain pan 9 of the threshing machine.

When the endless conveyor of the stone picker is smooth, it will permit stones and other loose material to roll downward, and at the same time it will carry the vines, pods, and other material to be threshed upwardly and forwardly to the threshing cylinder 3.

The upper and lower rollers or pulleys 5 and 6 of the inclined stone picker conveyor are mounted on shafts 10 and 11 which are journaled in upper and lower bearings 12 and 13. The upper bearings are secured to the frame 14 of the threshing machine and the lower bearings 13 are slidably mounted in suitable guides 15 carried by the sides 16 of the frame of the inclined stone picker conveyor. The frame of the inclined stone picker conveyor may be of any desired construction and preferably consists of the sides 16 and transverse connecting bars 17. The guides 15 which may be secured to the sides of the frame of the inclined conveyor by any suitable means as clearly indicated in Fig. 1 of the drawings are provided with slots 18 to receive the bearings 13 and they have threaded through their upper ends adjusting screws 19 which engage sockets 20 of the slidable bearings 13 for stretching the belts 4 of the endless conveyor to maintain the same at the proper tension on the upper and lower rollers 5 and 6.

The upper shaft 10 and the upper bearings 12 of the inclined stone picker conveyor form a hinge connection for the upper end of the conveyor and enable the inclined conveyor to be swung upwardly or downwardly for adjusting the inclination of the conveyor to suit conditions and the inclined conveyor is adjusted and maintained in its adjusted position by means of inclined adjustable connections 21 located at opposite sides of the inclined conveyor and consisting of upper and lower rods or sections 22 having their adjacent ends 23 threaded and connected by a turnbuckle 24. The upper and lower rods or sections are provided at their outer ends with upper and lower eyes 25 and 26; the lower eyes receive the terminal portions of the lower shaft 11 of the inclined conveyor and the upper eyes 25 are arranged on suitable pivots 27 located at opposite sides of the feeding conveyor and mounted on the frame 14 of the threshing machine. By adjusting the turnbuckle the inclined stone picker conveyor and also a casing 28 may be raised and lowered to arrange the inclined conveyor at the proper inclination to suit conditions.

The upper flights or runs of the belts 4 are arranged on and supported by an apertured platform 29 which may as illustrated in Fig. 4 of the drawings consist of spaced longitudinally disposed slats secured to the transverse connecting bars of the frame of the inclined conveyor at regular intervals. Also an apertured conveyor may as illustrated in Figs. 5 and 6 of the drawings consist of spaced longitudinally disposed slats 30 disposed at an angle to the longitudinal axis of the conveyor in a diagonal like arrangement. Also the platform may as shown in Figs. 7 and 8 consist of a plate 31 of metal or other suitable material provided at intervals with perforations 32. The apertures formed by the perforations 32 and also by the spaces between the slats or bars of the platforms shown in Figs. 4 and 5 permit fine dirt to pass through the conveyor and fall into the casing 28. Also the perforations 32 of the platform may be omitted and when the perforations are omitted the platform may be constructed of either metal or wood.

The casing 28 which is secured to and carried by the frame of the stone picker conveyor in the adjustment thereof is designed to be constructed of sheet metal or other suitable material and it consists of a tapered hopper shaped upper portion and a lower portion of uniform horizontal cross sectional area and it is provided with a central vertical transverse partition 33 which divides the casing into a stone receiving compartment or receptacle 34 and a dirt receiving compartment or receptacle 35. The upper tapered portion of the dirt receptacle is provided with an extension 36 and it extends substantially the entire length of the inclined conveyor at the lower side thereof so as to receive all of the dirt falling through the stone picker. The blades 7 of the inclined conveyor clear the upper end of the inclined wall 37 of the casing 28 and also the upper end of the vertical partition 33 which is located substantially in the plane of the lower shaft 11. The upper tapered portion of the compartment or receptacle 34 extends outwardly beyond the lower end of the inclined conveyor so that stones too large to be carried upwardly between the blades 7 will slide down the inclined conveyor and fall into the stone receiving compartment or receptacle 34. The receptacles 34 and 35 may be provided at the bottom with any suitable means for discharging their contents or the receptacles may be left open at the bottom so that the lower portions of the receptacles or compartments 34 and 35 will form chutes for discharging the stones and dirt from the casing.

The tines 8 which are laterally spaced a sufficient distance, permit the small stones and separated grain carried upward by the inclined conveyor to pass between them and fall upon the grain pan 9. The tines 8 which may be constructed of any suitable material are preferably supported by a fixed angle bar 38 and they extend from the angle bar to the front portion 39 of the concave 40 of the threshing mechanism. The angle bar tine support 38 is located adjacent the upper end of the inclined conveyor and is suitably secured to the frame of the threshing machine.

The feeding conveyor 2 which is of the ordinary construction consists of an endless belt or apron provided at intervals with transverse cleats 41 and arranged on front and rear rollers or pulleys 42 and 43. The feeding conveyor extends to a point above and intermediate the ends of the inclined conveyor so that the material placed upon the feeding conveyor will be carried by the feeding conveyor to the inclined conveyor. The fluffy vines and the unthreshed pods will be carried over the inclined conveyor and delivered to the threshing cylinder and the concave while the threshed beans, stones, dirt and other heavy foreign material will fall upon the inclined conveyor of the stone picker and will be prevented from reaching the threshing mechanism and injuring the same. The feeding conveyor is designed to be driven in the usual manner and, as any ordinary driving means may be employed, illustration thereof is deemed unnecessary. The conveyor of the stone picker, which may be operated by any suitable means, can conveniently be driven from the shaft 44 of the rear roller 43 of the feeding conveyor by a V-belt 45 and pulleys or sheaves 46 and 47 mounted, respectively, on the feeding conveyor shaft 44 and on the upper shaft 10 of the conveyor of the stone picker, but any other suitable means, such as chain and sprocket gearing, may be employed for driving the inclined conveyor of the stone picker.

What is claimed is:

1. A stone picker for threshing machines having a threshing cylinder and a conveyor for feeding material to the threshing cylinder, said stone picker including an endless conveyor inclined upwardly beneath the discharge end of said feeding conveyor toward, and traveling in the direction of, the threshing cylinder to receive stones and dirt and other heavy and loose material, said inclined conveyor having means forming pockets open at their bottoms and of a size to receive and carry small stones and separated grain and at the same time forming a surface above the conveyor for causing large stones to roll counter to the motion of the conveyor to the lower end of the stone picking conveyor, and an inclined platform supporting the upper run of the inclined conveyor and having apertures to permit dirt to pass through the inclined conveyor.

2. A stone picker for threshing machines having a threshing cylinder and a feeding conveyor, said stone picker including an endless conveyor inclined upwardly beneath the feeding conveyor toward, and moving in the direction of, the threshing cylinder to receive stones, dirt and other heavy and loose material, and means on the conveyor forming a series of pockets of a size to exclude large stones, and open at the bottom thereof for permitting dirt to fall therefrom, said means upstanding from the conveyor and forming a surface above the conveyor upon which large stones roll to the lower end of the conveyor counter to its motion, and a casing located beneath the inclined conveyor and comprising a tapered hopper shaped upper portion and provided with a vertical partition dividing the casing into a stone receiving compartment and a dirt receiving compartment, the dirt receiving compartment extending substantially the length of the inclined conveyor and the stone receiving compartment projecting beyond the lower end of the inclined conveyor to receive the excluded stones falling from the lower end of the inclined conveyor.

3. A stone picker for threshing machines having a threshing cylinder and a feeding conveyor, said stone picker including a frame and an endless conveyor inclined upwardly beneath the feeding conveyor toward, and moving in the direction of, the threshing cylinder and having its upper portion hinged to the threshing machine, said inclined conveyor being provided with pockets of a size to carry small stones and the like and to exclude larger stones, the upper edges of which pockets form a surface downwardly upon which the excluded large stones roll to the lower end of the conveyor counter to its motion, adjusting means connecting the inclined conveyor with the threshing machine for adjusting the inclination of the stone picker conveyor, means forming a sifting base for the material carrying pockets to permit fall of dirt therethrough, and a casing mounted on and carried by the frame of the inclined conveyor and having a dirt receiving compartment and a stone receiving compartment, the dirt receiving compartment extending substantially the entire length of the inclined conveyor and the stone receiving compartment projecting beyond the lower end of the inclined conveyor to receive the larger stones falling from the conveyor.

4. A stone picker for threshing machines having a threshing cylinder and a feeding conveyor spaced from the threshing cylinder, said stone picker including an endless conveyor inclined upwardly beneath the discharge end of said feeding conveyor toward, and traveling in the direction of, the threshing cylinder, said inclined conveyor having a conveyor frame and being hinged at the upper end to the threshing machine, the upper portion of the inclined conveyor being located in the space between the feeding conveyor and the threshing cylinder, said inclined conveyor being also provided with apertures to permit fine dirt to pass through it and having pockets of a size to carry small stones and exclude larger stones for discharge down the endless conveyor counter to its motion, adjustable members connecting the lower portion of the inclined conveyor with the threshing machine to adjust the inclination of the inclined conveyor, a casing mounted on the frame of the inclined conveyor and having separate compartments, one of the compartments being arranged to receive dirt from the endless conveyor and the other compartment being arranged to recive the larger stones discharged from the inclined conveyor, said casing being carried by the inclined conveyor in the adjustment thereof, and a plurality of laterally spaced tines extending from the upper end of the inclined conveyor to the threshing cylinder for causing vines and unthreshed pods to be delivered to the threshing mechanism while permitting small stones and separated grain to fall into the grain pan.

WILLIAM S. GOUINLOCK.
HARRY TRUAX.